Nov. 21, 1961   F. E. ROMESBERG ET AL   3,009,207
PROCESS FOR THE FORMATION OF COMPOSITE FILMS
Filed March 21, 1957
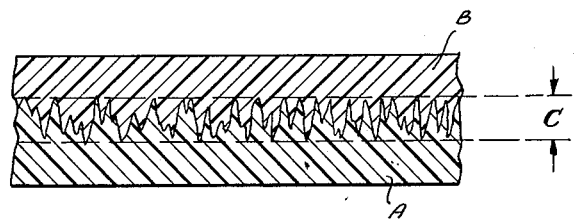
INVENTORS.
Floyd E. Romesberg
Robert M. Karlinski
BY
Griswold & Burdick
ATTORNEYS

United States Patent Office 3,009,207
Patented Nov. 21, 1961

3,009,207
PROCESS FOR THE FORMATION OF
COMPOSITE FILMS
Floyd E. Romesberg, Midland, and Robert M. Karlinski, Saginaw, Mich., assignors to The Dow Chemical Company, Midland, Mich., a corporation of Delaware
Filed Mar. 21, 1957, Ser. No. 647,633
8 Claims. (Cl. 18—57)

This invention relates to a process for the formation of composite films from two or more thermoplastic films. More particularly it relates to such a process which eliminates the need for calendering or other pressure application.

By composite film is meant a single integral continuous film of two or more materials composed in such a way that each of the materials is present in predominant amount in a particular area of the cross-section of the composite film but which do not present a sharply defined interface but rather meet, with considerable intermixing of the materials, in an interfacial area. Such composite films are desirable for many reasons. It should be possible to create many unusual decorative and ornamental effects by combining two or more materials of different color, texture, or other characteristic. It should also be possible to create an article consisting of a core with a sheath continuously bonded about it. Thus a material which has highly desirable properties such as strength, may be notoriously unstable to heat, light, weather, water, chemicals, or other environment. By bonding a sheath of a material stable to that environment about that core the weak property of the core material is effectively overcome. In the past it has been necessary to laminate two or more materials together to arrive at such a composite product. That entailed the preparation of each of the materials separately into the approximate shape desired in the final article followed by a lamination step. To assure a good continuous bond between the materials it was necessary to use adhesives or tremendous pressures, or both. Even with such rigorous preparative methods there was no assurance that the bond would remain unbroken under all conditions of use. It would be desirable if a composite article could be prepared in which two materials would be bonded to each other in an interfacial zone which would consist of a mutual intermixing and intertwining of both of the materials and the provision of such a composite article is the principal object of this invention.

It is a further object to provide such an article of thermoplastic materials.

It is a still further object to provide a process for preparing composite articles.

It is another object to provide a process for preparing such articles without the need for huge pressures and without requiring separate adhesives.

The above and related objects are accomplished by the continuous localized coagulation of certain polymer latexes into a continuous coherent coagulum, the washing and drying of said coagulum to form a microporous film, and subsequently the deposition on said microporous film of a film-forming dispersion of a solid in a non-solvent for the microporous film followed by drying and finally fusion of the composite article. For purposes of this application the term, localized coagulation, means the controlled coagulation of a polymer latex at the site at which the coagulum is formed in the approximately desired shape as contrasted to the coagulation of a large volume of latex with subsequent shaping.

The microporous films are conveniently prepared as disclosed by one of the present applicants and another in concurrently filed application Serial No. 647,632, filed March 21, 1957, from the latexes of certain vinylidene chloride and acrylonitrile copolymers. Thus, it has been found that when the latex employed is one prepared by the emulsion polymerization of from 92 to 99 percent by weight of vinylidene chloride and correspondingly from 8 to 1 percent by weight of acrylonitrile, the product resulting from the continuous, localized coagulation is the desired microporous film. When the copolymer composition of the latex is outside of these limits, there either results no continuous film, the film lacks requisite porosity for the subsequent steps of this process, or the pores are of macro-dimensions and are unsuitable for use in this invention.

The latexes for use in this invention should preferably contain from about 30 to about 50 percent by weight of non-volatile solids. When the latexes contain appreciably less than 30 percent solids, it is difficult to obtain continuous, coherent articles by the simple deposition of the latex. When appreciably more than 50 percent of non-volatile solids are present in the latex, the latex is extremely sensitive to mechanical forces and to storage and may coagulate prematurely. In addition the latex solids affect the porosity of the films. Those latexes having about 30 percent solids result in films having about 75 percent porosity and those of about 50 percent solids give films of about 40 percent porosity.

In general the film-formability of a latex is dependent to a great extent on the particle size of the copolymer forming the latex. In this process the particle size serves the further function of determining the pore size and together with the latex solids determines the porosity of the film. Latexes having relatively large particle sizes will usually result in films having greater porosity and also having larger individual pores than will result from latexes having smaller particle sizes. The latex particle size is a function of the kind and concentration of emulsifier, the temperature of polymerization, and rate of agitation used in forming the initial dispersion. For this process it has been found that it is preferred to have the microporous films prepared from latexes having individual particle sizes of from about 500 to about 1200 Angstrom units. This film will have from about 40 to about 75 percent by volume of porosity or void space. Latexes having particle sizes from about 300 to about 2000 Angstrom units may be used but those latexes having particle sizes smaller than the indicated preferred range will result in films which are correspondingly less permeable. Those films prepared from latexes having particle sizes larger than the indicated preferred range will be correspondingly weaker.

To obtain continuous, coherent articles it is necessary that the copolymer of the latex be predominantly in the amorphous state. When the latex is first formed the copolymer is predominantly in the amorphous state but gradually crystallizes. Accordingly it is preferred to prepare the microporous film as soon as possible after polymerization and necessarily before the crystallinity has reached the limit at which film-formability is destroyed.

The continuous localized coagulation may be carried out by contacting the latex with a solid, nonporous deposition base, such as a continuous belt of a polysiloxane rubber, which has been wetted with an aqueous solution of a coagulant for the latex. Such coagulants are well known and typically are water soluble, polyvalent metal salts, such as magnesium and calcium chlorides. The coagulant is usually employed in a concentration of from about 5.0 to about 40 percent by weight.

Following the coagulation the so-formed porous coagulum is washed to remove substantially all of the coagulant and is dried at a temperature below the fusion temperature of the copolymer forming the microporous film and preferably from 100° C. to about 140° C.

The microporous film is characterized by having a plurality of labyrinthine passages extending completely through the thickness of the film. The actual sizes of the pores are incapable of accurate measurement, but the films are permeable to gases and water. Some films have been prepared which have filtered solid particles of 700 Angstrom units average diameter from aqueous dispersion thereof. As heretofore indicated the films have from 40 to 75 percent porosity or void space.

It may be desirable to incorporate certain additives such as colorants and stabilizers into the microporous film. This is conveniently achieved by passing the dried microporous film through a solution of the additive for a time sufficient to allow absorption of the desired concentration of the additive. The film containing the additive is then redried before undergoing the subsequent steps of the process of this invention.

As a next sequential step in the process the microporous film is coated with a film forming dispersion of a solid. A wide selection of these coating materials is available. The continuous phase must be a non-solvent for the copolymer of the microporous film. The particle size of the disperse phase should approximate the pore size of the microporous film. If this particle size is appreciably larger than the pore size, there will be little diffusion of disperse phase into the microporous film with the result that the interfacial area will be narrowed toward a planar configuration. That would give a bonding strength of no greater force than the adhesive strength of the two materials. If the particle size of the disperse phase is appreciably smaller than the pore size of the microporous film the possibility for complete diffusion of the disperse phase throughout the microporous film exists. That would result in a homogeneously blended product similar to that which would be produced if all the materials were first blended, and the blend then fabricated into the article. Such products have considerable merit but are not the stratified products comprehended by this invention. When the particle size of the disperse phase approximates the pore size of the microporous film there will be sufficient diffusion of the disperse phase into the surface of the microporous film to provide an interfacial area consisting of a blend of both materials after subsequent treatment. In addition, however, there will be an area which is predominantly of the composition of the microporous film and there will be a second area which is predominantly of the disperse phase of the coating. This arrangement of areas is illustrated schematically in greatly magnified cross-section in the annexed drawing. In the drawing, area A illustrates the position of a core material or substratum. Area B represents the disperse phase of the coating after film formation. Area C represents the interfacial area consisting of a blend of materials A and B.

Although the drawing illustrates a microporous film coated on one side, it should be apparent that a coating on both sides is equally possible by merely applying the same or different coating material to opposite sides of the film. A bilayer or polylayer wrapping material is most valuable for exploiting the inertness to liquids, vapors and gases, stability to light and heat, and other advantageous characteristics of two or more types of film forming materials in packaging applications.

The materials useful as the coatings are any which are capable of forming a continuous, coherent film. Other thermoplastic polymers and copolymers are especially convenient to use and accordingly are preferred. Polymers and copolymers are either readily available or easily prepared in a finely divided state, are fusible into continuous coherent films at about the same temperatures as the microporous substratum, can be had with a variety of properties and characteristics, and are sufficiently compatible with the substratum to assure a good bond. It is further preferred to employ the polymer or copolymer in the form of an aqueous latex. In a latex a suitable particle size is immediately available without prior comminution. Further, latexes are available or easily prepared, and are easily handled in the subsequent steps. Non-emulsified dispersions are finely divided materials are not to be precluded however. Thus, it is possible to use as coating dispersions, things such as paste resin dispersions, if fluid enough to coat the substratum.

An unusual benefit of the process is that a latex which has lost its ability to be film forming by any of the usual film forming methods may be utilized as a coating dispersion in this process. By this way expected waste of materials may be obviated.

The coating dispersion may have any of the typical additives incorporated therein prior to coating. Thus, heat and light stabilizers, pigments, fillers, or other additives may be used. In carrying out the process it is possible to use an increment of the latex used in preparing the original microporous film. Thus, with this process it is possible to prepare an unstabilized core of a vinylidene chloride-acrylonitrile copolymer and to surround that core with a sheath of the same copolymer but highly stabilized or colored. Many other possibilities will be apparent.

The microporous film may be coated by any conventional method. The film may be immersed in a bath of the coating dispersion and the excess may be drained, wiped or doctored off. The film may be coated with the various transfer roll techniques or other casting methods. A still further method is to wet the surface of the microporous film and to cause continuous localized coagulation of a coating latex on the surface of the film. Regardless of the method employed it is only necessary that the coating be deposited in dispersion form so that the desired thickness is obtained.

Following the coating deposition, the coated microporous film is dried and fused. The temperatures to be used in drying and fusing will either be known or will be determined easily by simple preliminary experiment.

The dried and fused composite film may be subjected to any of the normal processing operations conventional with either of the materials employed alone. The film may be supercooled, oriented, wound, slit, trimmed, or treated in other conventional manners appropriate to the intended use.

The advantages and operation of the process and the character of the articles thus produced will be more apparent from the following illustrative examples wherein all parts and percentages are by weight unless otherwise indicated.

*Example 1*

A microporous film was prepared by the continuous localized coagulation of a latex prepared by the emulsion polymerization of a monomeric material consisting of 97 percent vinylidene chloride and 3 percent acrylonitrile to a non-volatile solids content of 36 percent. The average particle size of the copolymer in this latex was 700 Angstrom units.

A sample of the latex was allowed to stand until too crystalline to be used in the usual film forming techniques. A piece of the microporous film previously prepared was immersed in the crystalline latex, allowed to drain, and the so-applied coating was then coagulated on the film with calcium chloride. The coagulum coating was washed to remove substantially all of the calcium chloride, the composite was dried at 130° C. and fused at 160° C. The result was a composite film of about the indicated copolymer composition.

*Example 2*

A sample of the microporous film was coated using a doctor blade with a nylon dispersion sold commercially as Genton 261. The dispersion was allowed to evaporate and the composite was fused in an oven at 210° C. The composite was then supercooled and oriented longitudinally. Tapes were slit from the composite film and woven into coarse fabrics suitable for upholstery bolsters.

Example 3

Another sample of the microporous film prepared in Example 1 was coated on one side with a latex of a copolymer prepared by the emulsion polymerization of 89 percent vinylidene chloride and 11 percent butyl acrylate. The coating latex was coagulated on the film with calcium chloride, and the product was washed and dried. The composite was fused into a film useful for packaging applications.

Example 4

To a portion of a latex prepared by the emulsion polymerization of 70 percent ethyl acrylate and 30 percent vinylidene chloride to 10 percent non-volatile solids was added 2 percent dibenzoyl resorcinol, a known light stabilizer for haloethylene polymer films. A sample of the dried microporous film from Example 1 was coated with the latex and dried into a composite film. The composite was fused at 200° C., supercooled, and oriented. When the light stability of the composite film was checked with S–4 sunlamps, it was found to take 250 hours to reach an arbitarily predetermined discoloration.

By way of contrast the microporous film of Example 1 after fusing discolored to the same extent in the same test in 10 hours. When 2 percent dibenzoyl resorcinol was added to the film and subsequently fused, the discoloration occurred in 80 hours.

Example 5

Composite films were prepared as in Example 4. Narrow ribbons were cut from the films and compressed into a non-woven fabric. The fabric was found to have satisfactory fiber to fiber bonding.

When it was attempted to prepare such a fabric from uncoated ribbons, made from the microporous film, there was little bonding.

Example 6

To a sample of the latex of Example 1 was added 1 percent, based upon the solids of titanium dioxide as a pigment. A microporous film was prepared which was fused. The fused film was evaluated under S–4 sunlamps and found to reach a predetermined discoloration in 10 hours.

A sample of the microporous film prepared without any additives was coated with a latex prepared by the emulsion polymerization of 70 percent ethyl acrylate and 30 percent vinylidene chloride to 10 percent solids. The coating latex contained 2 percent of the latex weight of titanium dioxide. After fusing the composite was subjected to the above test and found to take 250 hours to reach the same degree of discoloration.

We claim:

1. A process for preparing composite films comprising as sequential steps the continuous localized coagulation of a latex prepared by the emulsion polymerization of from 92 to 99 percent vinylidene chloride and correspondingly from 8 to 1 percent by weight of acrylonitrile to form a continuous coherent coagulum; washing and drying said coagulum into a microporous film having from 40 to 75 percent porosity; depositing on said microporous film a film forming dispersion composed essentially of (1) as the continuous phase of a non-solvent for the polymer of said latex and (2) as the dispersed phase a thermoplastic polymeric material the particle size of said dispersed phase being approximately the same as the pore size of said microporous film; and fusing the combined coating and microporous film simultaneously to form a composite film.

2. The process claimed in claim 1 wherein said film forming dispersion is an aqueous polymer latex.

3. The process claimed in claim 2 wherein said latex is of the same copolymer composition as that used in forming said microporous film.

4. The process claimed in claim 2 wherein said latex is of a copolymer of vinylidene chloride and an alkyl acrylate.

5. The process claimed in claim 1 wherein said solid of said film forming dispersion is a polyamide.

6. The process claimed in claim 1 wherein said film forming dispersion is deposited on one side of said microporous film.

7. The process claimed in claim 1 wherein said film forming dispersion is deposited on both sides of said microporous film.

8. A composite film prepared by the process of claim 1.

References Cited in the file of this patent

UNITED STATES PATENTS

| | | |
|---|---|---|
| 2,308,724 | Stamberger | Jan. 19, 1943 |
| 2,324,735 | Spanel | July 20, 1943 |
| 2,453,052 | Van Etten | Nov. 2, 1948 |
| 2,530,362 | Morris | Nov. 14, 1950 |
| 2,707,805 | Smith et al. | May 10, 1955 |
| 2,724,011 | Strauss | Nov. 15, 1955 |
| 2,748,027 | Meier | May 29, 1956 |
| 2,794,753 | Duddy | June 4, 1957 |
| 2,880,466 | Gunderman et al. | Apr. 17, 1959 |

FOREIGN PATENTS

| | | |
|---|---|---|
| 148,921 | Australia | Nov. 5, 1952 |
| 505,579 | Great Britain | May 12, 1939 |